UNITED STATES PATENT OFFICE.

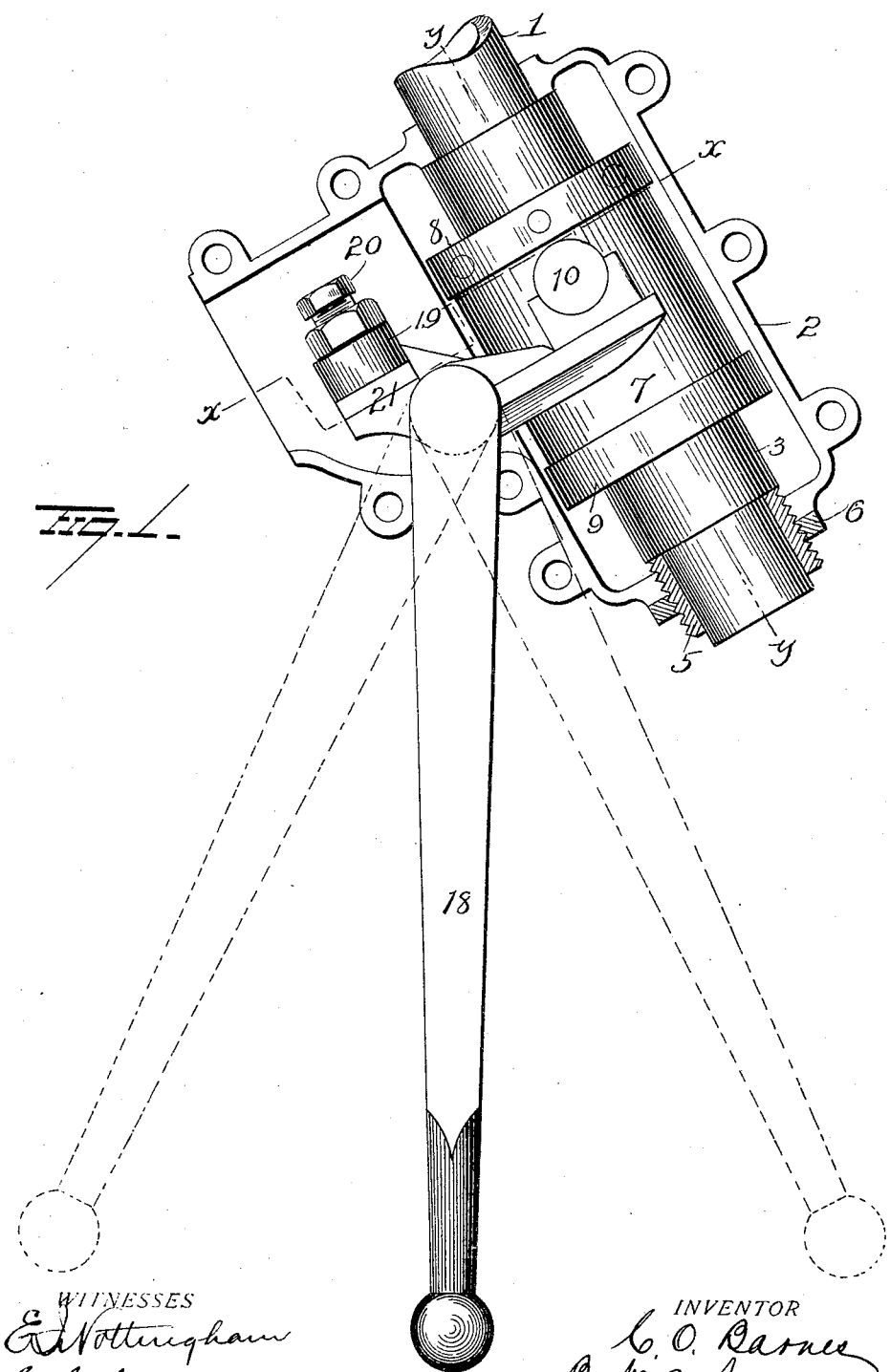

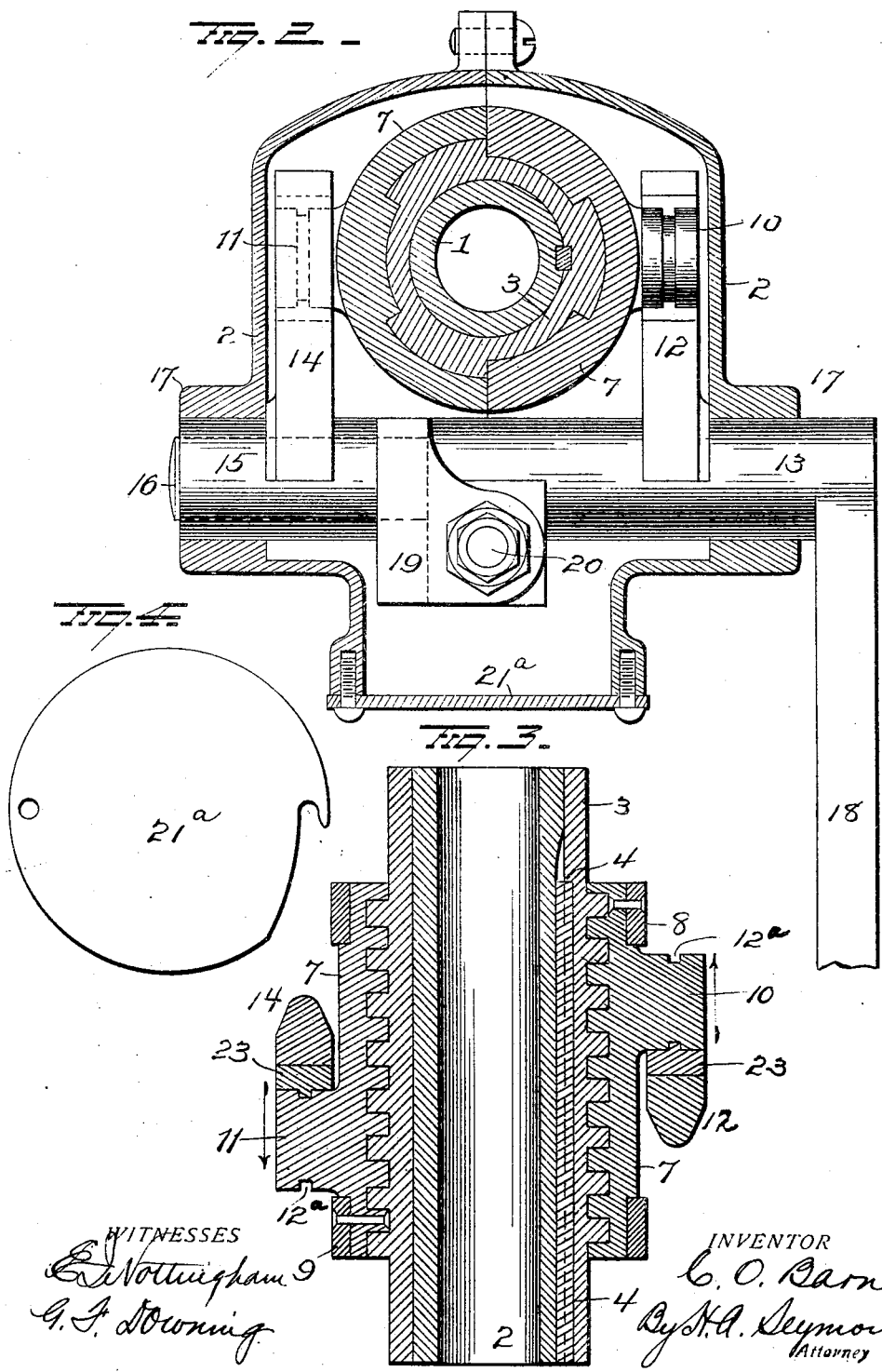

CHARLES O. BARNES, OF OSWEGO, NEW YORK, ASSIGNOR TO MARCIA I. BARNES, OF OSWEGO, NEW YORK.

STEERING MECHANISM FOR AUTOMOBILES.

No. 799,703.          Specification of Letters Patent.          Patented Sept. 19, 1905.

Application filed June 8, 1905. Serial No. 264,278.

*To all whom it may concern:*

Be it known that I, CHARLES O. BARNES, of Oswego, in the county of Oswego and State of New York, have invented certain new and useful Improvements in Steering Mechanism for Automobiles; and I do hereby declare the following to be a full, clear, and exact description of the invention, such as will enable others skilled in the art to which it appertains to make and use the same.

My invention relates to improvements in steering mechanism for automobiles, the object being to provide means whereby any and all wear on the actuating parts may be taken up, and thus prevent any lost motion between the steering-shaft and the mechanism connecting the front wheels of the vehicle.

With this object in view my invention consists in the parts and combinations of parts, as will be more fully described, and pointed out in the claims.

In the accompanying drawings, Figure 1 is a view in side elevation of my improvement, one-half the casing being removed. Fig. 2 is a view in section on the line $x\ x$ of Fig. 1, the entire casing being shown. Fig. 3 is a view in section on the line $y\ y$ of Fig. 1, and Fig. 4 is a view of the plate for closing the opening in the side of the casing.

1 represents the hollow steering shaft or post, mounted at its lower end in the two-part casing 2 and carrying the screw 3, the latter being secured to the steering-post by a suitable key 4. This screw 3 is located wholly within the casing and bears at its lower end on the externally-threaded collar 5, which latter is screwed into the lower end of the casing 2 and is locked against turning movement by the jam-nut 6. By this construction all end wear of the screw 3 can be taken up and the screw restrained from any endwise movement.

Located within the casing and surrounding and engaging the screw 3 is the two-part nut 7. This nut is divided longitudinally into half-sections, each of which is provided with threads conforming to the threads on the screw. The half-sections when assembled form a complete sectional nut, the sections of which are held together by the flat bands 8 and 9, one of which is secured to one section of the nut by rivets and the other band to the other section. Each band is thus secured to one section and loosely engages the adjacent end of the other section, and while they hold the sections solidly against the screw the sections are free to move longitudinally a limited distance, as will be hereinafter explained. Each section of the nut is provided with a laterally-projecting integral trunnion provided with a peripheral groove $12^a$. These trunnions 10 and 11 are located opposite each other, preferably midway the meeting edges of the two sections of the nut, but in different horizontal planes, as clearly shown in Fig. 2, the upper trunnion 10 being engaged at its under side by the arm 12 on shaft 13 and the lower trunnion 11 engaged on its upper side by the arm 14, integral with sleeve 15, mounted on the reduced end 16 of shaft 13.

The shaft 13 and sleeve 15 are mounted in bearings 17, formed in the sections 2 of the casing, and when turned by the screw and nut throw the pitman 18 in one direction or the other, the direction of movement of the pitman being dependent on the direction of rotation of the steering-post. This pitman 18 is connected by, preferably, a ball-and-socket connection with the lever mechanism connecting the front or steering wheels of the automobile. Hence when the steering-post 1 is turned the front or steering wheels of the vehicle are also turned.

Secured to and projecting from the sleeve 15 is the bracket 19, having a threaded opening therein for the passage of the screw 20, which latter bears at its lower or free end against the shoulder 21, projecting from the shaft 13. As the screw 20 is located to one side of the axis of shaft 13, it is evident that by forcing the screw toward and against shoulder 21 arm 12 will be forced up against its trunnion 10 and arm 14 down against its trunnion 11.

At the outstart the parts should be so adjusted that there can be no play or lost motion between the trunnions and their respective arms, thus insuring a responsive movement in the shaft to any movement imparted to the steering-post. As the threads on either the screw 3 or the nut 7 or the trunnions or arms 12 and 14 wear this wear can be compensated for by forcing screw 20 toward shoulder 21, thus elevating the section of nut 7, carrying trunnion 10, or depressing section of nut 7, carrying trunnion 11, or by elevating one section of nut 7 and depressing the other until all lost motion has been taken up, the separation of the sections of the nut being prevented by the bands 8 and 9, each of which is sufficiently wide to permit of ample movement to compensate for any wear between the threads without leaving or passing beyond the section of the nut which it loosely embraces, and by means of the threaded sleeve 5 all wear between the end of the screw and the casing 2 can be taken up.

With the devices for compensating for all wear, as above described, the gearing can be so adjusted that there will be no lost motion whatever between the steering-post 1 and the pitman 18, and by employing nut-and-screw gearing the front or steering wheels of the vehicle will be locked against any steering movement, except that imparted to them by a positive turn of steering-post, thus preventing any accidental movement of the steering-gear due to obstructions in the roadway.

The casing 2, which is designed to be secured to the vehicle, is provided with an opening at a point opposite the screw 20, so that access may be had to the screw 20 for adjusting same without removing or disconnecting any of the parts, this opening being normally closed by the plate 21$^a$, which latter is pivotally mounted on one screw 22 and hooks over a similar screw, as shown in Fig. 2.

I have shown each arm 12 and 14 provided with a bushing 23, having a rib to engage the peripheral slots 12$^a$ in the trunnions. These bushings take all the wear between these parts and can be renewed when necessary.

It is evident that many slight changes might be resorted to in the relative arrangement of parts herein shown and described without departing from the spirit and scope of my invention. Hence I would have it understood that I do not wish to confine myself to the exact construction of parts herein shown and described; but, Having fully described my invention, what I claim as new, and desire to secure by Letters Patent, is—

1. In a steering-gear for automobiles the combination with a steering-post and a screw thereon, of a two-part nut engaging the screw, a pitman and adjustable means connecting the pitman and both sections of the nut.

2. In a steering-gear for automobiles, the combination with a steering-post and a screw thereon, of a two-part nut engaging said screw, a two-part shaft, each part engaging one section of the nut, adjusting means connecting the two parts of the shaft, and a pitman connected to said sectional shaft.

3. The combination with a steering-post and a screw thereon of a nut having projecting trunnions, a two-part shaft, one part of the shaft having an arm engaging the under side of one trunnion and the other part of the shaft having an arm engaging the upper side of the other trunnion, adjusting means for holding both arms against their respective trunnions and a pitman connected to said sectional shaft.

4. The combination with a steering-post and a screw thereon of a nut divided longitudinally into two sections, each section having a trunnion, means for holding the two sections of the nut together, a two-part shaft, each part having an arm, one of which engages the upper face of one trunnion and the other the lower face of the other trunnion, means for adjusting the two sections of the shaft to compensate for wear between the threads of the nut and screw and a pitman secured to the shaft.

5. The combination with a steering-post and a screw thereon, of a two-part nut engaging said screw, each part of the nut having a laterally-projecting trunnion, a two-part shaft, each part of the shaft having an arm, one arm engaging the upper face of one trunnion and the other arm the lower face of the other trunnion, an adjusting-screw carried by one part of the shaft and engaging a shoulder on the other part, the said screw being located in rear of the axis of the shaft and a pitman secured to said shaft.

6. The combination with a steering-post and a screw thereon of a sectional nut embracing the screw, each section of the nut having a laterally-projecting trunnion, a shaft having an arm engaging the lower face of one trunnion, a sleeve journaled on said shaft and forming a part thereof, the said sleeve having an arm engaging the upper face of the other trunnion, a screw carried by one section of the shaft and engaging a projection on the other section of said shaft and a pitman secured to said shaft.

7. The combination with a steering-post and a screw thereon, of a two-part nut engaging the screw, each part of the nut carrying a band or ring designed to receive one end of the other part of the nut, a trunnion projecting from each part of the nut, a two-part shaft, one part having an arm engaging the upper face of one trunnion and the other part having an arm engaging the lower face of the other trunnion, means for adjusting the two parts of the shaft whereby the arms thereof are maintained in close contact with the trunnions and a pitman carried by the shaft.

8. The combination with a casing, a steering-post passing through same and a screw on the post within the casing, of a threaded sleeve screwed to the casing and bearing against the lower end of the screw, a nut engaging the screw and a shaft actuated by said nut.

In testimony whereof I have signed this specification in the presence of two subscribing witnesses.

CHARLES O. BARNES.

Witnesses:
 W. MAY FULLER,
 L. F. FULLER.